(12) United States Patent
Babineau, Jr. et al.

(10) Patent No.: US 6,964,282 B2
(45) Date of Patent: *Nov. 15, 2005

(54) COATED FIBROUS PIPE INSULATION SYSTEM

(75) Inventors: Francis John Babineau, Jr., Parker, CO (US); Fred Migliorini, Highlands Ranch, CO (US); Michael S. Casavant, Stroudsburg, PA (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/850,512

(22) Filed: May 20, 2004

(65) Prior Publication Data

US 2005/0022892 A1    Feb. 3, 2005

Related U.S. Application Data

(63) Continuation-in-part of application No. 10/449,781, filed on May 30, 2003, now Pat. No. 6,782,922.

(51) Int. Cl.⁷ .................................................. F16L 9/14
(52) U.S. Cl. ..................... 138/149; 138/158; 138/169; 138/170
(58) Field of Search ................ 138/149, 151, 138/158, 169, 170; 428/36.91

(56) References Cited

U.S. PATENT DOCUMENTS

| | | | | |
|---|---|---|---|---|
| 1,439,653 A | * | 12/1922 | Waldo | 138/141 |
| 2,872,947 A | * | 2/1959 | Isenberg | 138/109 |
| 3,475,920 A | * | 11/1969 | Jacobs | 62/273 |
| 4,205,105 A | * | 5/1980 | Blundell | 428/36.4 |
| 4,259,981 A | * | 4/1981 | Busse | 137/375 |
| 4,874,648 A | * | 10/1989 | Hill et al. | 428/35.9 |
| 5,762,109 A | * | 6/1998 | Matthews et al. | 138/149 |
| 6,016,846 A | * | 1/2000 | Knittel et al. | 138/128 |
| 6,403,180 B1 | * | 6/2002 | Barrall | 428/36.5 |
| 6,782,922 B1 | * | 8/2004 | Migliorini et al. | 138/149 |

* cited by examiner

*Primary Examiner*—James Hook
(74) *Attorney, Agent, or Firm*—Robert D. Touslee

(57) ABSTRACT

A pipe insulation system includes a tubular core of fibrous insulation and a flexible closed cell foam layer overlaying the core and forming an outer surface of the system. The tubular core has a first longitudinal slit extending completely through the wall of the core and a second longitudinal slit in the inner surface of the tubular core, opposite the first slit, that forms a hinge permitting the tubular core to be opened and closed to place the system about a pipe. Preferably, the foam layer has a water vapor permeance rating of 0.02 perms or less and the pipe insulation system includes a seal for sealing the first slit so that an outer surface layer of the sealed system formed by the foam layer and seal has a water vapor permeance rating of 0.02 perms or less.

15 Claims, 1 Drawing Sheet

COATED FIBROUS PIPE INSULATION SYSTEM

This patent application is a continuation-in-part of patent application Ser. No. 10/449,781 filed on May 30, 2003 now U.S. Pat. No. 6,782,922.

BACKGROUND OF THE INVENTION

The subject invention relates to a coated pipe insulation system and in particular, to a coated pipe insulation system that includes a tubular core of fibrous insulation and a flexible closed cell foam layer that overlays and is bonded to an outer surface of the tubular core. The pipe insulation system of the subject invention is especially well suited for insulating cold pipe systems.

Fiberglass pipe insulation, such as fiberglass pipe insulation marketed by Johns Manville International, Inc. under the trade designation Micro-Lok® pipe insulation, is a preformed tubular insulation used to insulate pipe ranging in nominal diameter from about 0.5 inches to about 30 inches. The pipe insulation typically comes in 36 inch (0.92 m) long sections with wall thicknesses ranging from about 0.5 inches (13 mm) to 6 inches (152 mm) and in densities ranging from 3 to 6 pcf (0.48 to 0.96 grams/cc). Each pipe insulation section has a first longitudinally extending radial slit extending completely through the tubular wall and a second longitudinally extending radial slit, opposite the first slit, that extends only part of the way through the tubular wall to form a hinge that allows the pipe insulation section to be opened, placed over, and closed about a length of pipe.

These fiberglass pipe insulation sections are typically produced with coverings that are adhesively bonded to the outer surfaces of the sections with an adhesive that typically is a hot melt adhesive. The coverings are typically made of paper-scrim-foil or paper-scrim-MPET where MPET is polyethylene terephthalate with vacuum-sputtered aluminum deposited on at least one surface of the film. The coverings (hereinafter referred to as "jackets") perform multiple functions:

the jackets contain and protect the fiberglass insulation core;

the jackets generally provide an acceptable finished appearance, i.e. a generally smooth, white matte finish with subtle scrim lines visible through the paper;

the jackets retard water vapor transmission into the fiberglass insulation core, generally with a water vapor transmission test value of 0.02 perms or lower, as tested to ASTM E 96 standard, but do not provide a barrier to water vapor transmission into the fiberglass insulation core; and the jackets provide a means to secure the pipe insulation to itself with a tape or other mechanical fastener that engages the jacket.

When cold pipe systems are being insulated with these jacketed fiberglass pipe insulation sections or other jacketed fibrous pipe insulation sections, special precautions must be taken to keep water vapor form condensing from the atmosphere onto the cold pipe. ASTM C 755, Section 4.1, states:

"Experience has shown that uncontrolled water entry into thermal insulation is the most serious factor causing impaired performance. Water entry into an insulation system may be through diffusion of water vapor, air leakage carrying water vapor, and leakage of surface water. Application specifications for insulation systems that operate below ambient dew-point temperatures should include an adequate vapor barrier system."

Cold pipe systems are considered to be those systems where the temperature of the fluid in the pipe is between 35° F. and 65° F. Because ambient conditions in many areas of the United States can commonly result in dew points that are higher than the pipe temperatures, condensation of water vapor can occur in these cold systems. Condensation on the outside of the jacketed pipe insulation sections can contribute to liquid water damage or microbial growth, and condensation on the inside of the jacketed pipe insulation sections can contribute to corrosion of the pipe and a loss of thermal insulation efficiency.

To inhibit condensation from accumulating in these cold pipe systems, the pipe insulation must be installed with a wall thickness sufficient to maintain the outer surfaces of the jacketed fibrous pipe insulation sections warmer than the dew point. If the jacketed fibrous pipe insulation sections do not have sufficient thickness to maintain the outer surfaces of the jacketed fibrous pipe insulation sections above the dew point, condensation will occur on the outside of the jacketed fibrous pipe insulation sections. In addition to the thickness requirement, a water vapor barrier layer [referred to as a "Type I" vapor barrier in ASTM C 921-89 (reapproved 1996)] has customarily been used to cover the jacketed fibrous pipe insulation sections to keep water vapor from condensing on the outer surface of the jacketed fibrous pipe insulation and migrating into the insulation where it would condense.

Since current jacketed fibrous pipe insulation does not provide a water vapor barrier, if jacketed fibrous pipe insulation is to be installed on cold pipe systems in an unconditioned space, current industry practices recommend that a post-applied layer of PVC (a PVC jacket) be installed over the jacketed fibrous pipe insulation sections to keep water vapor out of the cold pipe insulation system. The PVC jacket must be sealed with either tape or solvent based welding products. This is the most common way to get a vapor barrier layer that meets the ASTM C 921 Type I standard. However, with this method, the installers must first install the jacketed fibrous pipe insulation and then go back over the entire job a second time to install the PVC jackets over the jacketed fibrous pipe insulation. Thus, this method of sealing cold pipe insulation systems is both expensive and time consuming.

In addition to the need to enclose the jacketed fibrous pipe insulations in PVC jackets when the jacketed fibrous pipe insulations are applied to cold pipe systems, the use of jacketed fibrous pipe insulations may present other problems. While jacketed fibrous pipe insulations generally provide an acceptable appearance, the appearance of the jackets on such pipe insulations can be degraded under certain conditions. The jackets of fibrous pipe insulations are not an integral part of the insulation cores, but, typically, are only bonded to the fibrous insulation cores on each side of the longitudinally extending opening formed in the fibrous cores by the longitudinal slits in the cores. Since the jackets are only bonded to the fibrous cores along the openings formed by the longitudinal slits, rough handling, contact with pipe hangers, butt strip application (joining and sealing adjacent pieces of pipe insulation), etc., may cause deformations in the jackets, such as wrinkling or dimpling, at locations where the jackets are not directly adhered to the fibrous cores. In addition, the absorption of water by some jackets under humid conditions may also cause the jackets to wrinkle or dimple.

The installation of jacketed pipe insulations can also present problems. During the installation of pipe insulation, an installer has to navigate around numerous obstructions such as pipe hangers, valves, elbows, flanges, etc. Normally, the jacketed pipe insulation must be cut to fit the jacketed pipe insulation to the pipe system so that the jacketed pipe insulation accommodates these obstructions. As discussed above, current fibrous pipe insulations have jackets that are adhered to the fibrous cores with lines of adhesive on each side of the longitudinal openings formed by the slits in the fibrous cores. Frequently, these lines of adhesive are not adequate to hold the jackets in place on the cores during and after the cutting of the jacketed fibrous pipe insulations. Some installers resort to stapling the jackets to the cores near the locations of the planned cuts in order to secure the jackets to the cores during and after cutting. This procedure increases the time for installation and breaches the vapor retarding jackets. Sometimes, after cutting pipe insulations, the installer will need to trim the jackets with scissors to provide the jackets with a clean uniform appearance after installation. Again, this extra installation step increases the time required for installation.

Recently, a fiberglass pipe insulation has been introduced that does not block the passage of water vapor, but utilizes a wicking membrane situated around the inside of the fiberglass pipe insulation section. In theory, this membrane is supposed to carry liquid water, which has condensed at the cold pipe surface, back to the outer surface of the pipe insulation section (using capillary action and gravity) where the liquid water is supposed to evaporate. However, these wicking systems are expensive and the installation of these wicking systems requires the exercise of special care. In addition, since liquid water is placed in contact with the outer surface of the cold pipe in these systems, the effectiveness of the system is variable and highly dependent upon ambient temperature and relative humidity. In general, these systems tend to be more effective in low humidity environments and lose their effectiveness in ambient conditions approaching 90° F. and 90% humidity.

Alternative pipe insulation systems to fiberglass pipe insulation systems exist for insulating cold pipe systems. These alternative systems do not have fibrous tubular cores and are mainly closed-cell insulation materials, such as cellular glass, polyisocyanurate foam, rubber, and similar products. However, these products tend to be expensive, time consuming to install, and are prone to installation errors or system breaches.

SUMMARY OF THE INVENTION

The subject invention provides a solution to the problem of insulating cold pipe systems by providing a coated fibrous pipe insulation system that in a preferred embodiment does not require an auxiliary outer PVC jacket to provide the system with a water vapor barrier. The coated fibrous pipe insulation of the subject invention does not require stapling to hold the coating in place during and after cutting or the use of scissors to give the coated fibrous pipe insulation a clean uniform appearance after the coated fibrous pipe insulation has been cut during installation. In addition, the coating of the coated fibrous pipe insulation of the subject invention will not be prone to wrinkling or dimpling.

Each pipe insulation section of the coated fibrous pipe insulation system of the subject invention has a tubular fibrous insulation core coated with a flexible closed cell foam layer that is coextensive with and bonded to the substantially cylindrical outer surface of the tubular core. The wall of the tubular core has a first longitudinal slit extending completely there through and a second longitudinal slit in the inner surface of the tubular core that is substantially opposite the first slit and extends only partially through the wall of the tubular core to form a longitudinally extending hinge in the tubular core that permits the tubular core to be opened, placed over, and closed about a length of pipe. Preferably, the coating layer on the coated fibrous pipe insulation sections of the subject invention as applied to a pipe system has a water vapor permeance rating of 0.02 perms or less and, more preferably, functions as a water vapor barrier. Preferably, the coated fibrous pipe insulation sections of the subject invention are held and sealed about a pipe with an adhesive strip, a solvent weld, or an adhesive material or coating. Preferably, the coated fibrous pipe insulation sections have a thickness and thermal conductivity, for a temperature between 35° F. and 65° F. at the inner surface of the core and a temperature of 90° F. and a relative humidity of 90% at the outer surface of the core, that locates the dew point within the wall of the core at a location spaced from both the inner and outer surfaces of the core wall.

DESCRIPTION OF THE PREFERRED EMBODIMENTS

Figure 1:
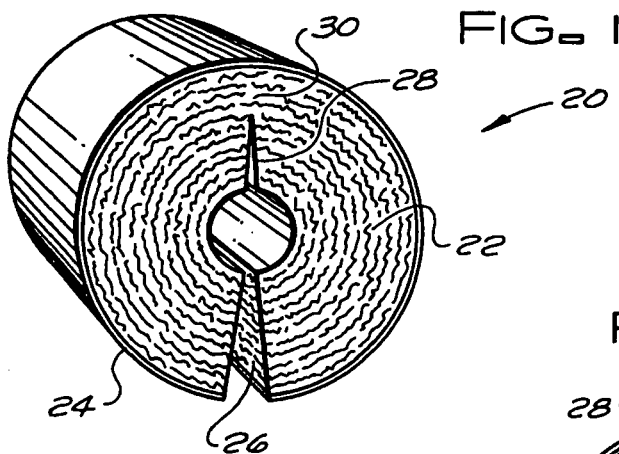
FIG. 1 is a perspective view of a coated fibrous pipe insulation section of the subject invention with the section partially opened.

As shown in FIG. 1, each preformed coated fibrous pipe insulation section 20 of the coated fibrous pipe insulation system of the subject invention has a tubular fibrous insulation core 22 with substantially cylindrical inner and outer surfaces and a flexible closed cell foam layer 24 that is coextensive with and bonded to the substantially cylindrical outer surface of the tubular core. The wall of the tubular core 22 has a first longitudinally extending radial slit 26 extending completely there through and a second longitudinally extending radial slit 28 in the inner surface of the tubular core 22 that is substantially opposite the first slit 26 and extends only partially through the wall of the tubular core 22 to form a longitudinally extending hinge 30 in the tubular core that permits the tubular core 22 to be opened, placed over, and closed about a length of pipe. Typically, the slit 28 extends between one half and three quarters of the way through the wall of the core.

The coated fibrous pipe insulation sections 20 are typically used to insulate pipes 32 ranging in nominal diameter from about 0.5 inches to about 30 inches. The coated fibrous pipe insulation sections 20 typically comes in 36 inch (0.92 m) long sections with wall thicknesses ranging from about 0.5 inches (13 mm) to 6 inches (152 mm) and in densities ranging from 3 to 6 pcf (0.48 to 0.96 grams/cc). While other fibrous insulations may be used to form the fibrous insulation core 22 such as, but not limited to, mineral wool, the preferred fibrous insulation forming the insulation core 22 is fiberglass insulation.

The closed cell foam layer 24 contains and protects the fibrous core 22 and may be made of various flexible polymeric closed cell foam materials such as but not limited to a rubberized closed cell foam insulation marketed by Armacel under the trade designation "ARMAFLEX". Preferably, the closed cell foam layer 24 is white with a smooth, durable outer surface. The closed cell foam coating layer 24 may be applied to the outer surface of the core 22 by any suitable method such as, but not limited to, spraying, extrusion coating, pultrusion coating, or other methods and may be applied in a single or multiple step process. The closed cell foam layer 24 must be flexible so that the fibrous pipe insulation section 20 can be flexed open about hinge 30 and closed about a pipe without cracking and preferably, without even forming a permanent crease. Preferably, the closed cell foam layer 24 is dimensionally stable, especially when subjected to diverse levels of ambient temperature and humidity, and has good stability in moist or steamy environments where the fibrous pipe insulation section 20 will be installed such as, but not limited to, those found in mechanical rooms, boiler rooms, and other environments with the potential for steam and higher ambient temperatures. Preferably, the closed cell foam layer 24 should be cuttable with a non-serrated knife and should not deteriorate, delaminate, or crack under normal service conditions.

Preferably, the fibrous pipe insulation section 20 has a composite flame spread and smoke developed rating equal to or less than 25/50 as measured by the ASTM E 84-01 tunnel test method, entitled "Standard Test Method for Surface Burning Characteristics of Building Materials", published July 2001, by ASTM International of West Conshohocken, Pa.

Preferably, the closed cell foam layer 24 contains additives such as, but not limited to, UV stabilizers and antimicrobial agents and/or fungi growth inhibiting agents. An example of a fungi growth-inhibiting agent is the fungi growth resistance additive 2-(4-Thiazolyl)Benzimidazole, also known as "TBZ". Multiple forms of TBZ are available for specific applications in polymers, adhesives, coatings and additives. One example of the fungi growth resistance additive is available from Ciba Specialty Chemicals under the trade designation Irgaguard F-3000 fungi growth resistance additive. It is believed that the inclusion of the Irgaguard F-3000 fungi growth resistance additive in amounts between 0.05% and 0.5% by weight of the materials in the polymeric coating 24 of the coated fibrous pipe insulation sections 20 will effectively inhibit fungi growth. Examples of other antimicrobial, biocide fungi growth-inhibiting agents that may be used are silver zeolyte fungi growth inhibiting agents sold by Rohm & Haas Company under the trade designation KATHON fungi growth-inhibiting agent, by Angus Chemical Company under the trade designation AMICAL 48 fungi growth-inhibiting agent, and by Healthshield Technologies, LLC. under the trade designation HEALTHSHIELD fungi growth-inhibiting agent.

Preferably, the closed cell foam layer 24 on the fibrous pipe insulation sections 20 has a water vapor permeance rating of 0.02 grains/$ft^2$·hour·inch Hg or less (0.02 perms or less) as measured by "Standard Test Methods for Water Vapor Transmission of Materials", ASTM Designation E 96-00, approved Apr. 10, 2000, and, more preferably, functions as a water vapor barrier to prevent water vapor transmission through the closed cell foam layer 24 into the fibrous core 22. It is currently believed that a closed cell foam layer 24 that is about 0.25 inches in thickness will provide the closed cell foam layer 24 with the desired water vapor transmission characteristic of 0.02 perms or less. For certain applications, it is contemplated that the closed cell foam layer 24 may have a water vapor permeance rating greater than 0.02 perms in which case the thickness of the closed cell foam layer 24 may be adjusted to achieve the desired water vapor permeance rating.

Figure 2:
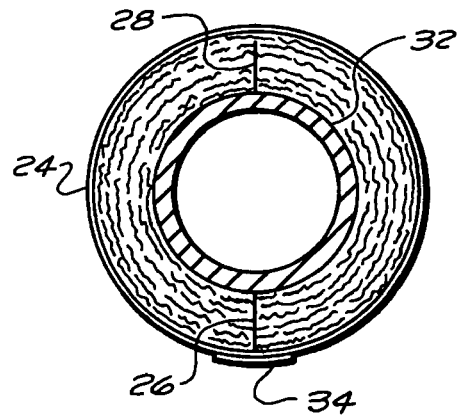
FIG. 2 is an end view of the coated fibrous pipe insulation section of FIG. 1 installed on a pipe and held in the fully closed position by an adhesive strip.
Figure 3:
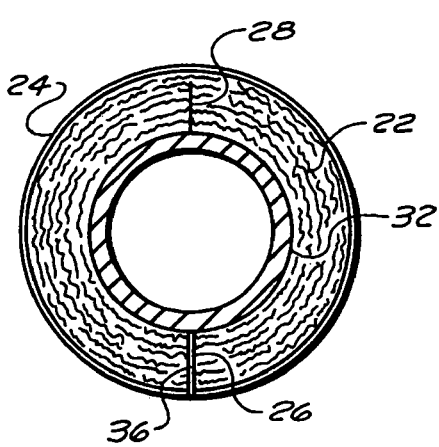
FIG. 3 is an end view of the coated fibrous pipe insulation section of FIG. 1 installed on a pipe and held in the fully closed position by an adhesive coating or solvent weld.

The coated fibrous pipe insulation sections 20 may be held and sealed about a pipe with an adhesive strip 34 as shown in FIG. 2 that extends along the entire length of and bridges the slit 26 or the coated fibrous pipe insulation section 20 may be held and sealed about a pipe with a solvent weld that extends along the entire length of the slit 26 and bridges the slit 26 or an adhesive coating 36 that extends along the entire length of the slit 26 bonding the opposed surfaces of the slit 26 together as shown in FIG. 3. Preferably, the closed cell foam layer 24 of a coated fibrous pipe insulation section 20, as applied to and sealed about a pipe 32, e.g. with an adhesive strip 34, a solvent weld, or an adhesive coating 36, has a water vapor permeance rating of 0.02 perms or less and, more preferably, functions as a water vapor barrier so that an auxiliary PVC jacket is not required to prevent the passage of water vapor into the core 22 when using the coated fibrous pipe insulation section 20 to insulate a cold pipe system.

Figure 4:
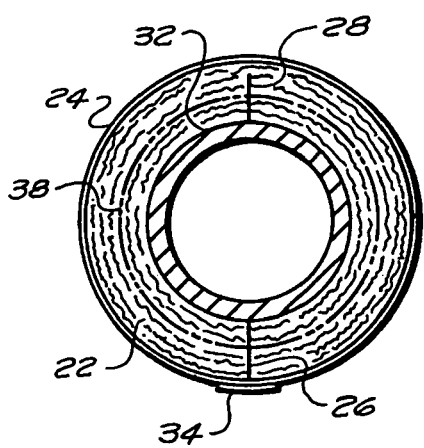
FIG. 4 is an end view of the coated fibrous pipe insulation section of FIG. 1 installed on a pipe and schematically showing the location of dew point within the wall of the section.

Preferably, the coated fibrous pipe insulation sections 20 have a thickness and thermal conductivity, for a temperature between 35° F. and 65° F. at the inner surface of the core 22 (a cold pipe system) and a temperature of 90° F. and a relative humidity of 90% at the outer surface of the core 22, that locates the dew point within the wall of the core 22 as schematically shown in FIG. 4. As shown in FIG. 4, the dew point is located along a dashed line 38 that is spaced inward from the outer surface of the core wall and outward from the inner surface of the core wall so that condensation does not occur on the outside of core 22 to cause water damage or encourage microbial growth or on the inside surface of the core 22 to contribute to corrosion of the pipe 32.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A fibrous pipe insulation system, comprising:
a tubular core of fibrous insulation having a length and a longitudinal axis; the tubular core having a substantially cylindrical outer surface; the tubular core having a substantially cylindrical inner surface; the tubular core having a wall extending between the cylindrical outer surface and the cylindrical inner surface; the wall of the tubular core having a radially extending thickness; the wall of the tubular core having a first slit extending completely there through; the first slit extending parallel to the longitudinal axis of the tubular core for the length of the tubular core; the tubular core having a second slit in the inner surface of the tubular core; the second slit being substantially opposite the first slit; the second slit extending parallel to the longitudinal axis of the tubular core for the length of the tubular core; and the second slit extending only partially through the wall of the tubular core to form a longitudinally extending hinge in the tubular core that permits the tubular core to be opened and closed to place the tubular core about a pipe; and a closed cell foam layer coextensive with and bonded to the substantially cylindrical outer surface of the tubular core; the closed cell foam layer being flexible so that the tubular core with the closed cell foam layer can be opened, placed about a pipe, and closed without cracking the closed cell foam layer; and the substantially cylindrical outer surface of the core has a first radius; the substantially cylindrical inner surface of the core has a second radius; and for a temperature at the substantially cylindrical inner surface of the core between 35° F. and 65° F. and a temperature of 90° F. and a relative humidity of 90% at the substantially cylindrical outer surface of the core, a dew point temperature is attained within the wall of the core at a radial distance less than the first radius and spaced inwardly from the substantially cylindrical outer wall of the core and greater than the second radius and spaced outwardly from the substantially cylindrical inner wall of the core.

2. The fibrous pipe insulation system according to claim 1, wherein:
the closed cell foam layer has a water vapor permeance rating of 0.02 perms or less.

3. The fibrous pipe insulation system according to claim 1, including:
sealing means for sealing the first slit so that when the first slit is sealed by the sealing means an outer surface layer of the sealed fibrous pipe insulation system comprising the closed cell foam layer and the sealing means has a water vapor permeance rating of 0.02 perms or less.

4. The fibrous pipe insulation system according to claim 3, wherein:
the sealing means is a strip with an adhesive surface for bonding the tape to the closed cell foam layer.

5. The fibrous pipe insulation system according to claim 3, wherein:
the sealing means is an adhesive for closing the first slit and bonding opposing surfaces of the closed cell foam layer and first slit together.

6. The fibrous pipe insulation system according to claim 1, wherein:
the thickness of the core wall is between 0.5 and 6 inches.

7. The fibrous pipe insulation system according to claim 1, wherein:
the thickness of the core wall is between 0.5 and 6 inches; and
the second slit has a depth between 0.5 and 0.75 of the core wall thickness.

8. The fibrous pipe insulation system according to claim 1, wherein:
the tubular core of fibrous insulation system is a tubular core of fiberglass insulation; and
the length of the tubular core is about 36 inches, the thickness of the wall of the tubular core is between about 0.5 inches and 6 inches, and the tubular core fits pipes having nominal diameters between about 0.5 inches and 30 inches.

9. The fibrous pipe insulation system according to claim 1, wherein:
the closed cell foam layer is a water vapor barrier that prevents the passage of water vapor through the closed cell foam layer into the tubular core.

10. The fibrous pipe insulation system according to claim 9, including:
sealing means for sealing the first slit so that when the first slit is sealed by the sealing means an outer surface layer of the sealed fibrous pipe insulation system, comprising the closed cell foam layer and the sealing means, is a water vapor barrier that prevents the passage of water vapor through the closed cell foam layer and the sealing means into the tubular core.

11. The fibrous pipe insulation system according to claim 10, wherein:
the sealing means is a strip with an adhesive surface for bonding the tape to the closed cell foam layer.

12. The fibrous pipe insulation system according to claim 10, wherein:
the sealing means is an adhesive for closing the first slit and bonding opposing surfaces of the closed cell foam layer and first slit together.

13. The fibrous pipe insulation system according to claim 9, wherein:
the thickness of the core wall is between 0.5 and 6 inches.

14. The fibrous pipe insulation system according to claim 9, wherein:
the thickness of the core wall is between 0.5 and 6 inches; and
the second slit has a depth between 0.5 and 0.75 of the core wall thickness.

15. The fibrous pipe insulation system according to claim 9, wherein:
the tubular core of fibrous insulation is a tubular core of fiberglass insulation; and the length of the tubular core is about 36 inches, the thickness of the wall of the tubular core is between about 0.5 inches and 6 inches, and the tubular care fits pipes having nominal diameters between about 0.5 inches and 30 inches.

* * * * *